UNITED STATES PATENT OFFICE.

ALBERT R. MERZ, WILLIAM H. ROSS, AND JOHN N. CAROTHERS, OF WASHINGTON, DISTRICT OF COLUMBIA.

METHOD FOR THE RECOVERY OF PHOSPHORUS FUMES EVOLVED IN THE VOLATILIZATION METHOD OF TREATING PHOSPHATE-ROCK.

1,284,200. Specification of Letters Patent. Patented Nov. 5, 1918.

No Drawing. Application filed July 25, 1916. Serial No. 111,194.

(DEDICATED TO THE PUBLIC.)

*To all whom it may concern:*

Be it known that we, ALBERT R. MERZ, WILLIAM H. ROSS, and JOHN N. CAROTHERS, citizens of the United States of America, and employees of the Department of Agriculture of the said United States, residing at Washington, District of Columbia, (whose post-office address is Department of Agriculture, Washington, D. C.,) have invented a new and useful Method for the Recovery of Phosphorus Fumes Evolved in the Volatilization Method of Treating Phosphate-Rock.

This application is made under the act of March 3, 1883, chapter 143 (22 Stat., 625), and the invention herein described and claimed may be used by the Government of the United States or any of its officers or employes in the prosecution of work for the Government, or any person in the United States, without payment to us of any royalty thereon.

In the volatilization method of treating phosphate rock the latter is mixed with coke and silica in the proper proportions and ignited in an electric or other furnace to such a temperature that replacement of the acid radical of the phosphate rock is effected by the silica added and the phosphorus is evolved in the elemental form. Means are provided for its immediate oxidation to phosphorus pentoxid which in turn is absorbed by a series of absorbing towers. By circulating the acid solution through the towers, a solution may finally be obtained in this way containing a maximum of 50% phosphoric acid.

It is not practical, however, to obtain by this process a stronger solution than 50%, consequently in the use of such a solution for the preparation of such fertilizing materials as ammonium phosphate and double superphosphate the resulting product has to be dried in order to remove the water originally present in the phosphoric acid solution.

A further disadvantage in this method of collecting the phosphorus pentoxid lies in the fact that complete absorption of the fumes is diffcult to accomplish, requiring a more or less complicated system of absorbing towers.

Our invention relates to a process of collecting the phosphorus fumes in a more concentrated form than is possible by the absorption method; very complete recovery of the evolved fumes is accomplished; no circulation of the phosphoric acid solution is required; the process is applicable to the recovery of the phosphorus otherwise than in the form of phosphoric acid.

In carrying out our process the fumes evolved from the phosphate rock or other source of phosphorus are first passed through an oxidizing tower in the usual way and the current of gases is then made to pass by suction or otherwise through a porous filter consisting of any of the following compositions: filtrose, alundum, kieselguhr, unglazed porcelain or earthenware, or of any other similar nature. The filter may be constructed in the form of a series of cylinders or in any other way considered most practical for the recovery of the phosphorus in the form, hereinafter described, in which it is collected.

With filters of proper porosity it has been found possible to make complete recovery of the phosphorus pentoxid in the dry state. When steam is allowed to mix with the oxidized phosphorus fumes the filter has the effect of bringing the reacting gases into very intimate contact whereby complete conversion of the phosphorus pentoxid into phosphoric acid is simply effected in the walls of the filter without any circulation of the solution being necessary, and the strength of acid obtained can be regulated by the amount of steam added.

Again, if in place of steam there is used the proper amount of gaseous ammonia with the equivalent quantity of water vapor there is formed ammonium meta phosphate which may be recovered in the dry state by passing the current of gas in which the phosphate compound is suspended through the filter as already described.

Or, finally, if a potassium salt as potassium chlorid is blown in the form of a powder into the oxidizing chamber or in the chamber succeeding this, a reaction takes place between the potassium chlorid and the phosphorus pentoxid to form potassium meta-phosphate with evolution of chlorin. By the process of passing the gases containing the phosphate compound through the filter as before the compound may be recovered completely in the dry state while the chlorin passes through the filter and may be separately collected.

The essence of the invention is the obviation of the necessity in the manufacture of concentrated phosphorus compounds of dealing with the comparatively weak phosphoric acid solution obtained in the usual method in the absorbing towers. To this end the phosphorus compound is obtained directly from the fumes by the admixture of the desired substance which may be steam, ammonia, potassium chlorid, etc., and in filtering out the resulting product which by suction or otherwise is forced through a suitable filter such as filtrose, which is a trade name for a material in the nature of a mineral sponge. In the patent to Spilsbury, 994,282 of 1911, a similar material is used to separate zinc or lead oxids from furnace gases. We do not claim originality in the use of the filter.

What we claim is:

A process for recovering phosphorus evolved from phosphate rock by the volatilization method, consisting in introducing into the fumes of the phosphorus oxids any desired substance which will react with said fumes and collecting the resulting compound on a filter.

In testimony whereof, we affix our signatures in the presence of two subscribing witnesses.

ALBERT R. MERZ.
WILLIAM H. ROSS.
JOHN N. CAROTHERS.

Witnesses:
RAYMOND L. JOY,
JOSEPH G. SMITH.